United States Patent [19]

Purtschert

[11] 4,128,280
[45] Dec. 5, 1978

[54] SELF-PRESSURIZING FLOATING GAS BEARING HAVING A MAGNETIC BEARING THEREIN

[75] Inventor: Werner Purtschert, Winterthur, Switzerland

[73] Assignee: Sulzer Brothers Limited, Winterthur, Switzerland

[21] Appl. No.: 769,966

[22] Filed: Feb. 18, 1977

[30] Foreign Application Priority Data

Jan. 17, 1977 [CH] Switzerland .............................. 515/77

[51] Int. Cl.² ........................ F16C 39/04; F16C 39/06
[52] U.S. Cl. .......................................... 308/9; 308/10; 308/DIG. 1
[58] Field of Search ................... 308/DIG. 1, DIG. 4, 308/35, 9, 78, 10; 277/DIG. 5; 104/148 SS, 148 MS, 23 FS

[56] References Cited

U.S. PATENT DOCUMENTS

| 3,397,439 | 8/1968 | Hanau | 308/9 |
| 3,614,181 | 10/1971 | Meeks | 308/10 |
| 3,841,719 | 10/1974 | Smith | 308/9 |
| 3,939,776 | 2/1976 | Ross | 104/23 FS |

Primary Examiner—Stephen G. Kunin
Assistant Examiner—Reinhard J. Eisenzopf
Attorney, Agent, or Firm—Kenyon & Kenyon, Reilly, Carr & Chapin

[57] ABSTRACT

The bearing is a composite bearing comprised of a self-pressurizing floating gas bearing and a permanent magnet bearing. The permanent magnet bearing serves to support the bearing body in spaced relation to the support body at least during the starting up of the bearing body from a standstill condition to a running down of the bearing body to the standstill position. The bearing may be constructed as a radial or thrust bearing. The permanent magnet bearing may be located within or without the gas bearing.

15 Claims, 10 Drawing Figures

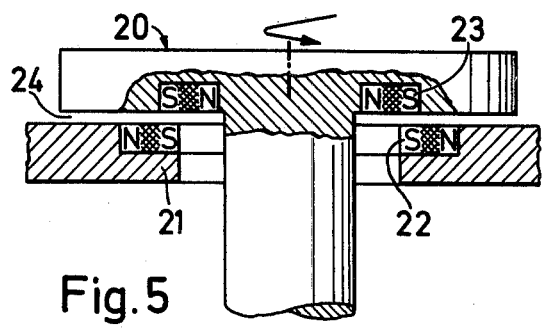
Fig. 5
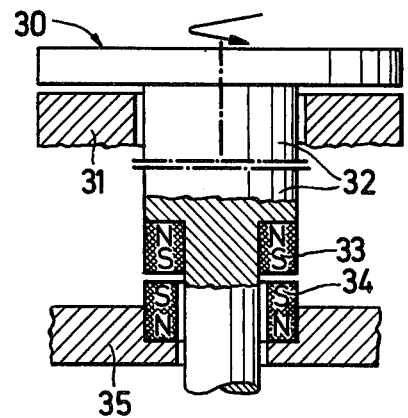
Fig. 6
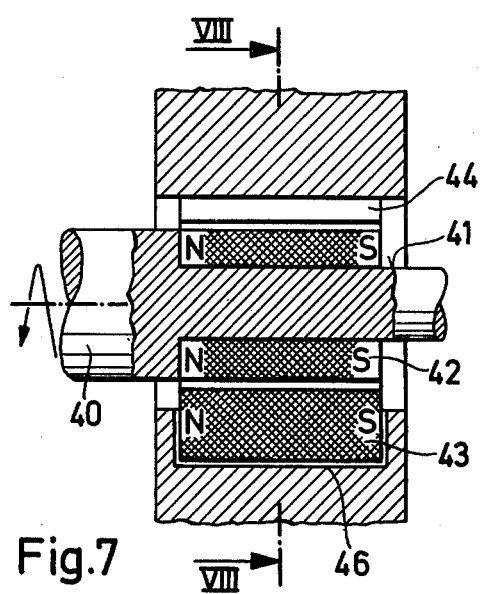
Fig. 7
Fig. 8
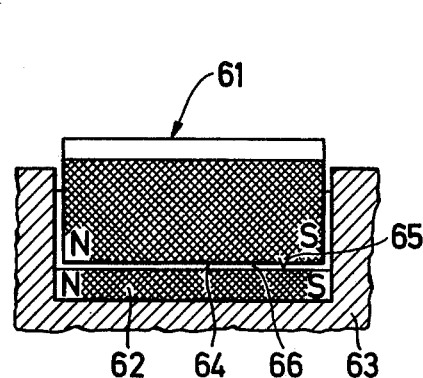
Fig. 9
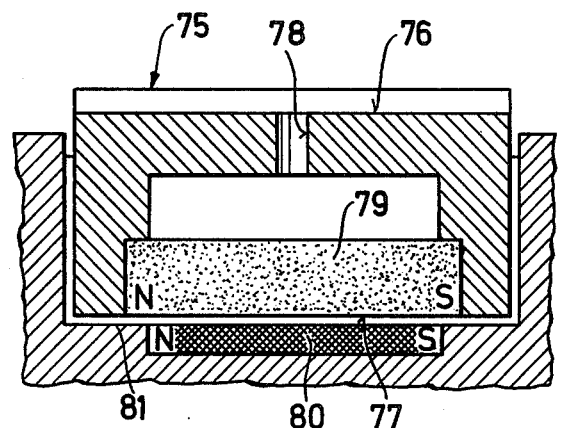
Fig. 10

SELF-PRESSURIZING FLOATING GAS BEARING HAVING A MAGNETIC BEARING THEREIN

This invention relates to a gas bearing and more particularly to a self-pressurizing floating gas bearing.

As is known, various types of bearings have been constructed over the years. Heretofore, bearings have been in the nature of radial or thrust bearings wherein there has been a rolling contact or a slide contact between two bodies. While these bearings have been known as anti-friction bearigs, frictional contact remains between the relatively moving surfaces of the bearing due, for example, to the interposition of rolling bodies between the moving surfaces. In order to overcome these friction forces, other bearings have been constructed to interpose a film of fluid such as a gas between the relatively moving surfaces of a bearing. Generally, these bearings are referred to as gas or air bearings. However, in these latter cases, the components of the bearings generally rest on one another when the bearings are not in operation. That is to say, the components do not become spaced apart until the bearings are placed in operation and a cushion of gas has been formed between the relatively moving surfaces of the bearing components. Further, it has been known that various self-pressurizing floating gas bearings require a separate pressurized-gas source for an auxiliary gas in order to bring about a separation between the relatively moving members during starting up from a standstill and running down to a standstill of the main bearing, that is, at low speeds of the bearing body. This is required since the self-generated gas pressure between the bearing components, i.e. between the bearing body and the support body is too low to bring about a separation between the two components. In addition, a control device is usually required in order to control the supply of the auxiliary gas to the bearing as a function of the speed of movement of the bearing body.

Accordingly, it is an object of the invention to provide a self-pressurized bearing which requires no separate source for an auxiliary gas.

It is another object of the invention to provide a self-pressurized floating gas bearing of simple construction.

It is another object of the invention to provide a gas bearing in which relatively movable bearing components are maintained in spaced relation without the need of external control devices.

Briefly, the invention provides a self-pressurizing floating gas bearing which comprises a support body having a bearing surface, a bearing body having a bearing surface facing the bearing surface of the bearing body and an auxiliary permanent magnet bearing supporting the weight of the bearing body. The bearing body is movably mounted with respect to the support body.

The gas bearing may be constructeed so that the auxiliary bearing is disposed within the bearing surfaces or outside the bearing surfaces of the support body and bearing body.

In one embodiment, the auxiliary bearing includes a permanent magnet which surrounds the bearing body and a second permanent magnet disposed in the support body below the permanent magnet on the bearing body. In this case, the bearing is constucted as a radial bearing and the bearing body may be in the form of a shaft which is rotatably mounted with respect to the support body.

In another embodiment, for example where the auxiliary bearing is disposed outside the bearing surfaces, the bearing body is rotatable about an axis perpendicular to the support body and has an axial extension. In this case, the auxiliary bearing includes a permanent magnet on the free end of the extension and a stationarily mounted permanent magnet opposite the magnet on the extension. In this case, the bearing is constructed as a thrust bearing.

In a further embodiment, the support body may be constructed with a pair of axially spaced apart annularly disposed bearing surfaces with the bearing body rotatably mounted within these surfaces in spaced relation to define a pair of gas bearings. In this case, the auxiliary bearing includes at least one permanent magnet surrounding the bearing body axially between the pair of gas bearings and a second permanent magnet disposed below the permanent magnet surrounding the bearing body.

In a further embodiment, the bearing may be constructed with a plurality of bearing segments which are mounted in the support body in spaced relation to the bearing body in order to define a gas bearing therebetween. In this case, at least the lowermost one of the segments is made a part of the auxiliary permanent magnet bearing. In addition, the auxiliary bearing includes a permanent magnet which surrounds the bearing body in opposed relation to the magnetic segment. Alternatively, the auxiliary bearing may include a permanent magnet which surrounds the bearing body and a permanent magnet in the lowermost segment in opposed relation to the permanent magnet surrounding the bearing body. Further, the support body may be formed with a bearing seat which receives the lowermost segment in spaced relation and a further auxiliary magnetic bearing may be disposed between this segment and the seat so that the segment is spaced from the seat during operation. In this latter case, the bearing segment may be constructed with a pair of oppositely disposed bearing surfaces respectively facing the bearing seat and the bearing body, a porous permanent magnet body forming at least a portion of one of the bearing surfaces and a flow connection which passes through the segment between the bearing surfaces.

When the auxiliary bearing is disposed within the gas bearing, a simple and compact construction is obtained. Further, the eddy current dissipation heat of the magnet is easily removed during operation due to the flow of gas from the main bearing.

These and other objects and advantages of the invention will become more apparent from the following detailed description and appended claims taken in conjunction with the accompanying drawings in which:

FIG. 5 illustrates a partial cross-sectional view of a gas bearing constructed as a thrust bearing in accordance with the invention;

FIG. 6 illustrates a modified thrust bearing having an auxiliary permanent magnet bearing disposed outside the bearing surfaces in accordance with the invention;

FIG. 7 illustrates a cross-sectional view of a segmented bearing constructed in accordance with the invention;

FIG. 8 illustrates a view taken on line VIII—VIII of FIG. 7;

FIG. 9 illustrates a cross sectional view of a bearing segment of the bearing of FIGS. 7 and 8; and FIG. 10 illustrates a modified bearing segment in accordance with the invention.

Figures 1, 2:
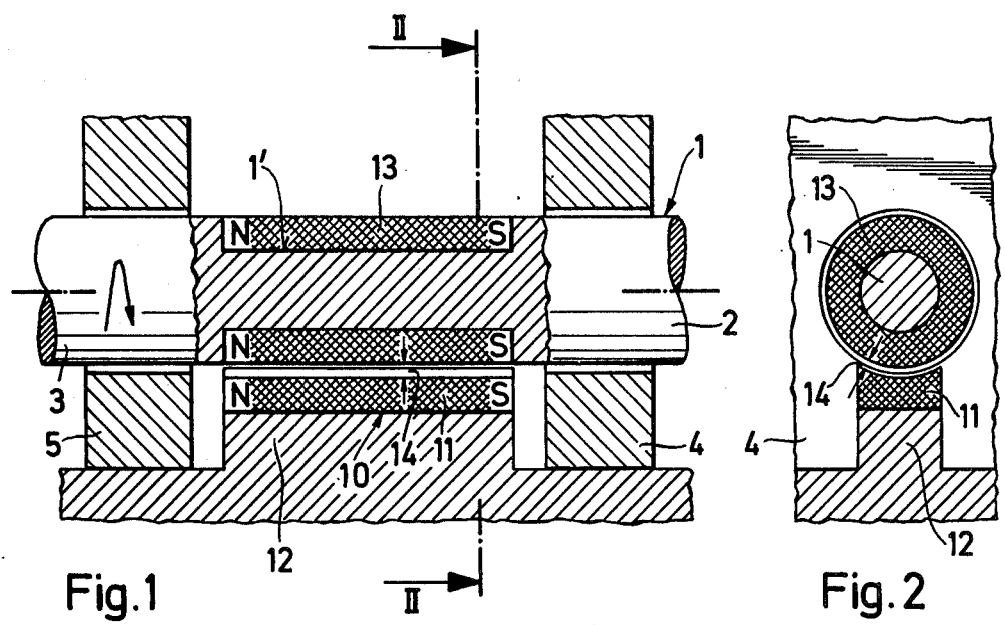
FIG. 1 illustrates a longitudinal cross sectional view of a radial bearing made in accordance with the invention.
FIG. 2 illustrates a view taken on line II—II of FIG. 1.

Referring to FIGS. 1 and 2, the self-pressurizing radial floating gas bearing comprises a bearing body in the form of a rotatable shaft 1 and a pair of support bodies 4, 5 which support the respective ends 2, 3 of the rotatable shaft 1. As is known, various constructions of self-pessurizing radial floating gas bearings are known, however, the specific designs per se are neither described nor illustrated. For example, the bearings illustrated may be groove bearings, tilting pad or segmented bearings and foil bearings. The support bodies 4, 5 may be considered as the main bearing for the shaft 1.

In addition, an auxiliary permanent magnet bearing 10 is associated with the main bearings. This auxiliary bearing 10 includes a permanent magnet 11 which is mounted on a support 12 between the support bodies 4, 5 and a hollow cylindrical permanent magnet 13 which is annularly disposed within a recess 1' of the shaft 1 opposite the magnet 11. The magnetic polarity of the two magnets 11, 13 is as shown in FIG. 1 such that the magnetic field of each extends in the axial direction. As shown, a working gap 14 is formed between the two magnets 11, 13 due to the given field pattern of the two magnets 11, 13 whereby the two magnets 11, 13 repel each other. Thus, the shaft 1 is always repelled. Depending upon the magnetic field strength in the working gap 14, the shaft is either lifted completely away from the support bodies 4, 5 or at least, the weight of the shaft 1 is compensated to the extent that no contact pressure or only a negligible contact pressure is exerted in the gas bearings.

In operation, when the shaft 1 starts up from the standstill position, there is little or no contact pressure between the shaft 1 and the support bodies 4, 5. Thus, no friction and no wear can occur. After the shaft 1 has reached a definite speed at which the gas pressure which is generated is large enough to ensure freedom of contact between the shaft 1 and the support bodies 4, 5, the magnetic lifting force remains effective. As a result, the auxiliary bearing continues to aid the main bearings with respect to their load carrying ability. This is of importance in case a sudden overload acts on the shaft, the auxiliary bearing neutralizes the overload. This operation also occurs when the shaft 1 runs down to the standstill position.

Alternatively, instead of using an axial field pattern as shown, the auxiliary bearing may also have a radial field pattern.

As is well known, permanent magnet bearings are very unstable transverse to their load-carrying direction and are sensitive to external forces. As compared to gas bearings, permanent magnet bearings have only little stiffness. This, in turn, limits their applicability. This property, however, has a beneficial effect if, as is the case here, the permament-magnet bearing is used as an auxiliary bearing for a main gas bearing. In this case, the permanent magnet bearing has to support only the constant weight of the bearing body. Thus, the permament magnet bearing cannot degrade the operational reliability of the main bearing.

Figures 3, 4:
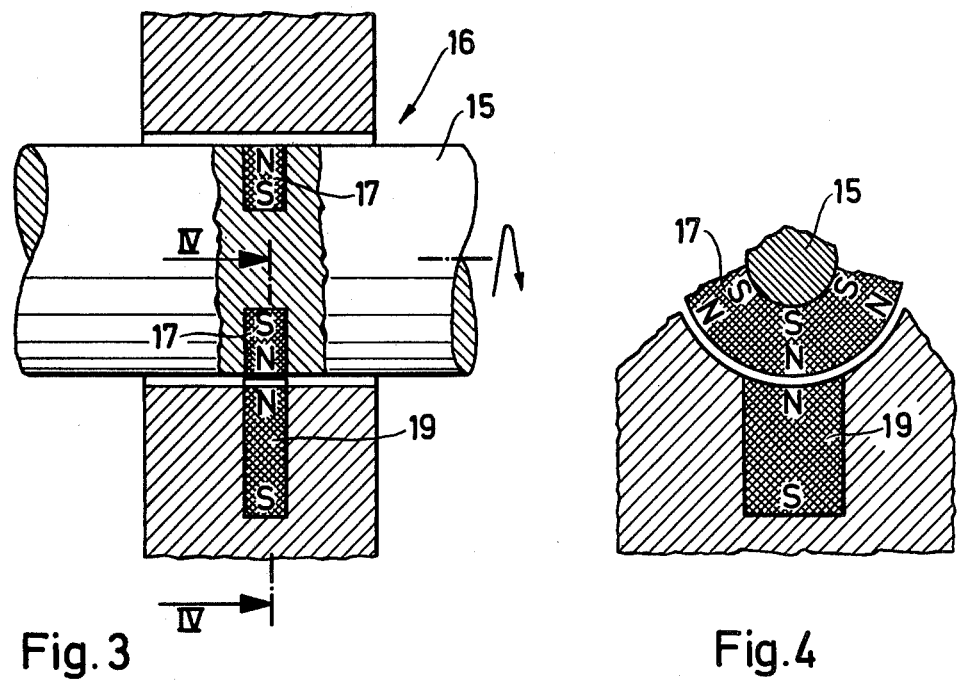
FIG. 3 illustrates a longitudinal cross sectional view of a radial gas bearing have an auxiliary permanent magnet bearing disposed within the bearing surfaces in accordance with the invention.
FIG. 4 illustrates a view taken on line IV—IV of FIG. 3.

Referring to FIGS. 3 and 4, the auxiliary magnet bearing can be disposed within the main gas bearing. To this end, a shaft 15 is supported in a self-pressurizing floating gas bearing 16 as the main bearing. The shaft includes a recess within the main bearing into which an annularly shaped permanent magnet 17 is mounted with a radial field pattern running from the inside out. In addition, a rod shaped permanent magnet 19 is disposed below the shaft 15, the field of which is opposed to the field of the magnet 17 so that the two magnets 17, 19 repel each other. The field of both magnets 17, 19 can, of course, be axial.

Referring to FIG. 5, the gas bearing may be of the thrust type. In this case, the bearing has a bearing body 20 which is rotatable about an axis perpendicular to a support body 21 so as to form the main bearing. The support body 21 is provided with an annular permament magnet 22 which is inserted into a recess in the support body 21 with a magnetic field which is radially and, more specifically, from the center of the bearing outward. In a similar manner, the bearing body 20 is provided with an annular permanent magnet 23, the magnetic field of which is likewise radial but opposed to the magnetic field of the magnet 22. The magnets 22, 23 together form the auxiliary bearing for the main bearing and are arranged relative to each other in such a manner that the south pole of the magnet 23 is located approximately opposite the south pole of the magnet 22. Because of the repelling force between the two magnets 22, 23, the bearing body 20 is lifted in the axial direction so as to be free of the support body 21 or at least in a non-resting position on the support body 21.

As shown, a gap 24 is provided between the bearing body 20 and support body 21 during operation. Thus, the unavoidable eddy current dissipation heat of the auxiliary bearing can easily be removed by the gas flowing through the gap 24 of the main bearing. This may be important at very high speeds such as may occur, for instance, in expansion turbines.

Referring to FIG. 6, the bearing may again be constructed as a thrust bearing but with the auxiliary bearing disposed outside the gas bearing surfaces. Such a construction may be required due to design and/or space requirements. In this case, the bearing includes a bearing body 30 which together with a support body 31 forms a self-pressurizing gas bearing as the main bearing. In addition, the bearing body 30 has an axial extension 32 which carries a permament magnet 33 at the free end. This magnet 33 is axially magnetized and, together with a like annular permanent magnet 34 which is stationarily mounted, for example in the support body 35, forms an auxiliary magnetic bearing for the main gas bearing.

Referring to FIGS. 7 and 8, the gas bearing may be constructed as a segmented bearing in which the main gas bearing and auxiliary magnetic bearing are functionally combined. In this case, the bearing segments are effective gas-dynamically and magnetically at the same time. As shown, the segmented bearing comprises a bearing body in the form of a shaft 40 which is provided with a shoulder 41 against which a hollow cylindrical permanent magnet 42 with an axial magnetic field is secured. Three bearing segments 43, 44, 45 are disposed in respective bearing seats 46, 47, 48 of the support body in order to form the supports for the shaft 40. As is well known, a gas pressure wedge 50 develops between the shaft 40 and the bearing segments 43, 44, 45 if the shaft 40 rotates in the direction as indicated by the arrow. In this case, the movements of the shaft 40 are confined without contact.

The bearing segment 43 which is the lowermost one of the bearing segments is axially magnetized in the same direction as the permanent magnet 42 on the shaft 40. In this way, the bearing segment 43 and the magnet 42 repel each other so that the shaft 40 is supported in spaced relation. As a result, no wear can occur at low speed.

The bearing segments 44, 45 are not magnetized as they do not support the shaft 40 and, only rest on the shaft 40 under their own light weight if the shaft 40 is standing still or rotates at low speed. These segments 44, 45 may, however, be magnetized so that they are supported by the shaft 40 without contact. In this case, the slight wear of these bearing segments 44, 45 and the shaft 40 at low speeds is prevented.

Evidently, the auxiliary magnetic bearing may be a suspension bearing instead of a supporting bearing as shown. In this case, the support 12 with the magnet 11 is arranged above the bearing body or shaft 1, the polarity of one of the magnets 11, 13 being reversed resulting in an attracting field between the two.

If the segmented bearings 43, 44, 45 are to function without friction in their respective bearing seats 46, 47, 48, or if this friction is to be as small as possible, an auxiliary magnetic bearing can also be formed between the bearing segments and the bearing seats. In such a case, as shown in FIG. 9, a bearing segment 61 is formed as a permanent magnet and a bearing seat 62 which is disposed within a stationary support body 63 is also magnetized. The magnets 61, 62 are provided with a magnetic field as illustrated so as to repel each other and form a gap 66 between the respective bearing surfaces 64, 65 of each. The repelling force in this auxiliary bearing is, at most, as much as, or somewhat less, than the force in the auxiliary bearing between the bearing segment and the shaft.

Advantageously, the bearing segment which supports the shaft during stand still and low rotation is made magnetic. Which bearing segment this is depends on the distribution of the bearing segments around the shaft and can pertain to more than one bearing. Of course, a bearing segment may be provided with a permanent magnet, instead of being magnetized itself. Also, the permanent magnet 42 and one or more bearing segments may be radially magnetized, instead of being magnetized axially.

Referring to FIG. 10, the bearing segments may be of alternative construction. For example, the bearing segment 75 may have a pair of oppositely disposed bearing surfaces 76, 77 which respectively face the bearing seat 81 and the bearing body (not shown) with a flow connection 78 passing through the segment between the bearing surfaces 76, 77. In addition, a porous body 79 which is formed at least as a portion of the bearing surface 77 is magnetized as illustrated. The magnetic porous body 79 together with a permanent magnet 80 in the bearing seat 81 forms a magnetic auxiliary bearing in the manner as described above.

The invention thus provides a gas bearing with an auxiliary bearing which serves to maintain the relatively movable components of the gas bearing in spaced apart relation during start-up from a standstill position and during rundown to the standstill position so as to reduce wear between the moving parts.

What is claimed is:

1. A self-pressurizing floating gas bearing comprising a support body having a first bearing surface thereon; a bearing body having a second bearing surface facing said first bearing surface, said bearing body being movably mounted with respect to said support body; and an auxiliary permanent-magnet bearing forming a magnetic field to at least compensate the weight of said bearing body whereby, said bearing body exerts no pressure or only a negligible pressure on said first bearing surface.

2. A self-pressurizing floating gas bearing as set forth in claim 1 wherein said auxiliary bearing is disposed within said bearing surfaces.

3. A self-pressurizing floating gas bearing as set forth in claim 2 wherein said auxiliary bearing includes a first permanent magnet surrounding said bearing body and a second permanent magnet disposed in said support body below said first permanent magnet.

4. A self-pressurizing floating gas bearing as set forth in claim 1 wherein said auxiliary bearing is disposed outside said bearing surfaces.

5. A self-pressurizing floating gas bearing as set forth in claim 4 wherein said bearing body is rotatable about an axis perpendicular to said support body and has an axial extension on said axis, and wherein said auxiliary bearing includes a first permanent magnet on a free end of said extension and a stationarily mounted permanent magnet opposite said first magnet.

6. A self-pressurizing floating gas bearing as set forth in claim 4 wherein said support body has a pair of axially spaced apart annularly disposed bearing surfaces, said bearing body is rotatably mounted within said annularly disposed bearing surfaces to define a pair of gas bearings therebetween, and said auxiliary bearing includes at least one permanent surrounding said bearing body axially between said pair of gas bearings and a second permanent magnet disposed below said permanent magnet surrounding said bearing body.

7. A self-pressurizing floating gas bearing as set forth in claim 1 which further comprises a plurality of bearing segments mounted in said support body in spaced circumferential relation to said bearing body to define a gas bearing therebetween, at least the segment of said segments supporting most of the weight of said bearing body being a part of said auxiliary bearing.

8. A self-pressurizing floating gas bearing as set forth in claim 7 wherein said one segment is permanently magnetic and wherein said auxiliary bearing includes a permanent magnet surrounding said bearing body in opposed relation to said magnetic segment.

9. A self-pressurizing floating gas bearing as set forth in claim 7 wherein said auxiliary bearing includes a permanent magnet surrounding said bearing body and a permanent magnet in said one segment in opposed relation to said permanent magnet surrounding said bearing body.

10. A self-pressurizing floating gas bearing as set forth in claim 7 wherein said support body has a bearing seat receiving said one segment in spaced relation and which further comprises an auxiliary magnetic bearing between said one segment and said seat.

11. A self-pressurizing floating gas bearing as set forth in claim 10 wherein said one bearing segment has a pair of oppositely disposed bearing surfaces respectively facing said seat and said bearing body, a porous permanent magnet body forming at least a portion of one of said bearing surfaces, and a flow connection passing therethrough between said bearing surfaces.

12. A gas bearing comprising
a support body having a first bearing surface,
a shaft rotatably mounted with respect to said support body and having a second bearing surface facing said first bearing surface to define a gap for a flow of gas therebetween during rotation of said shaft; and
an auxiliary permanent magnetic bearing forming a magnetic field to at least compensate the weight of said shaft whereby said shaft is spaced from said first bearing surface at start up from and run down to a standstill position.

13. A gas bearing as set forth in claim 12 wherein said bearing surfaces are disposed in concentric coaxial relation to form a radial bearing.

14. A gas bearing as set forth in claim 12 wherein said bearing surfaces are disposed in coaxial relation to form a thrust bearing.

15. A self-pressurizing floating gas bearing comprising
a support body having a first bearing surface thereon;
a bearing body having a second bearing surface facing said first bearing surface, said bearing body being movably mounted with respect to said support body; and
an auxiliary permanent-magnet bearing neutralizing at least part of the weight of said bearing body.

* * * * *

UNITED STATES PATENT AND TRADEMARK OFFICE
CERTIFICATE OF CORRECTION

PATENT NO. : 4,128,280

DATED : December 5, 1978

INVENTOR(S) : Werner Purtschert

It is certified that error appears in the above-identified patent and that said Letters Patent are hereby corrected as shown below:

Column 1, line 12, change "bearigs" to --bearings--

Column 1, line 67, change "constucted" to --constructed--

Column 3, line 21, change "pessurizing" to --pressurizing--

Column 6, line 41, after "permanent" insert --magnet--

Signed and Sealed this

Fifth Day of June 1979

[SEAL]

Attest:

RUTH C. MASON
Attesting Officer

DONALD W. BANNER
Commissioner of Patents and Trademarks